Figure 1:
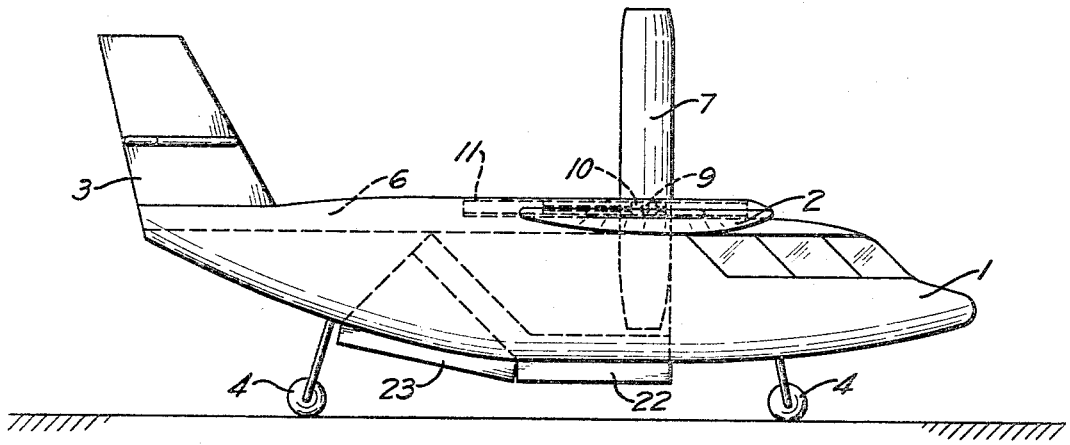

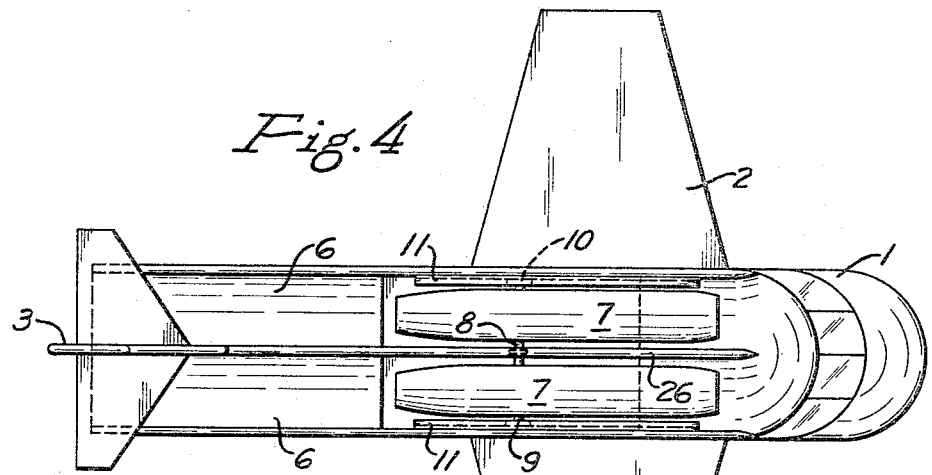
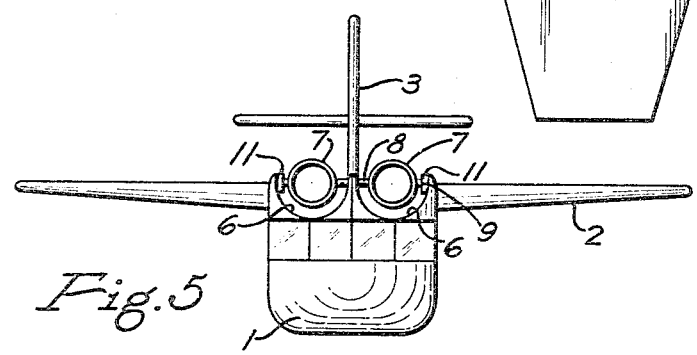
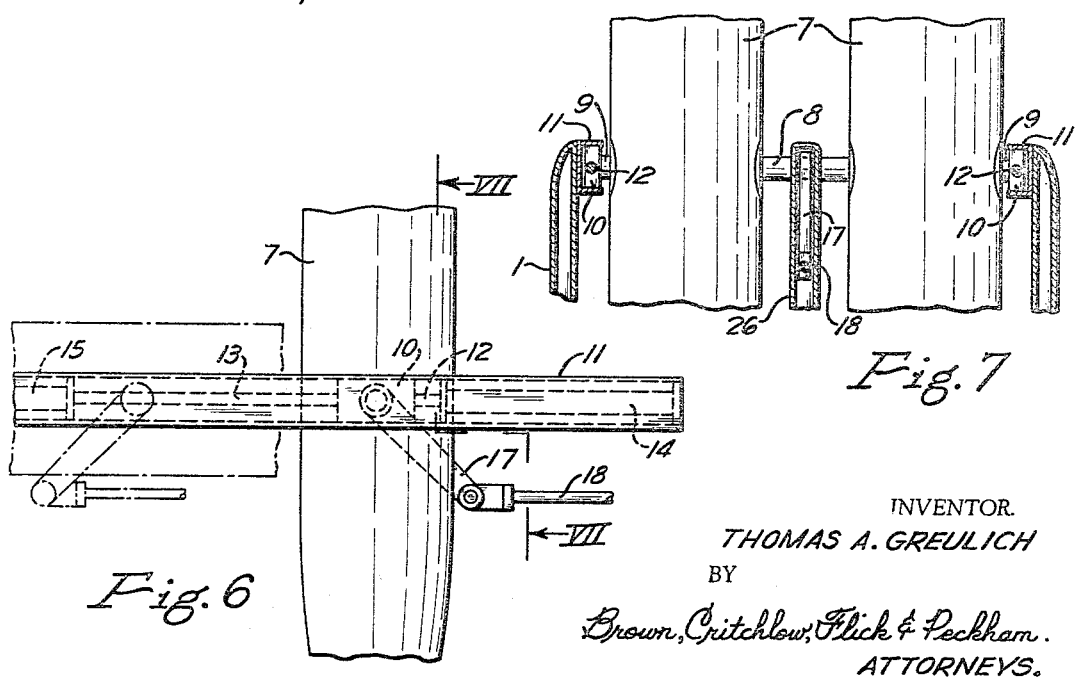

March 28, 1967 T. A. GREULICH 3,311,327
VERTICAL TAKE-OFF AND LANDING AIRPLANE
Filed June 17, 1965 3 Sheets-Sheet 3

INVENTOR.
THOMAS A. GREULICH
BY
Brown, Critchlow, Flick & Peckham
ATTORNEYS.

United States Patent Office 3,311,327
Patented Mar. 28, 1967

3,311,327
VERTICAL TAKE-OFF AND LANDING AIRPLANE
Thomas A. Greulich, 144 Spring House Lane, Pittsburgh, Pa. 15238
Filed June 17, 1965, Ser. No. 464,681
6 Claims. (Cl. 244—12)

This invention relates to airplanes that can take off and land vertically, and more particularly to those using jet engines.

There has been considerable activity in the field of designing and developing winged aircraft that can leave the ground substantially vertically and land in the same way. Many different system have been proposed or tried. In some cases the engines are rotated on a horizontal axis into a vertical position for take-off and landing, but they are out on the wings and if one engine fails while the plane is moving vertically the plane will immediately roll over. Other aircraft have used auxiliary engines in fixed position for the take-off and landing, while the usual horizontal engines are used for ordinary flight. It has even been proposed that horizontal jet engines move a plane vertically by deflecting their exhaust gases downward so that they issue from the bottom of the plane, but considerable thrust is lost by the change in direction of the gases, and the ducts that guide the gases are burned.

It is among the objects of this invention to provide a vertical take-off jet plane which uses the same jet engines for vertical travel as for horizontal travel, which makes efficient use of the full thrust of the engines, which can be prevented from rolling over even if one of the engines fails during vertical flight, which is easy to balance in both a longitudinal and a transverse direction, which is free of exhaust gas deflecting ducts, and the attitude controls of which are relatively simple and easy to operate.

In accordance with this invention, a pair of parallel jet engines normally extend along the top of an airplane fuselage between its wings, where the engines are pivotally connected to the fuselage on a transverse axis. Means are provided for tilting the engines on that axis to swing their rear ends in a curved path down into the fuselage until the engines are substantially vertical so that the plane can rise or descend nearly vertically. Pivoted control vanes are mounted in the fuselage in rows extending from beneath the vertical position of the engines rearwardly behind them. Some of the vanes are mounted on axes transverse to the fuselage and others of the vanes are mounted on axes transverse to the first-mentioned axes. Means are provided for adjusting the vanes on their axes while the exhaust from the engines is flowing down across them so that the attitude of the airplane can be controlled as it takes off and lands. While the engines are vertical or are rotating toward their normal horizontal position, the bottom of the fuselage below the vanes is open for the escape of the jet engine exhaust gases. Means may be provided for adjusting the engines lengthwise of the fuselage to balance it better.

Figure 2:
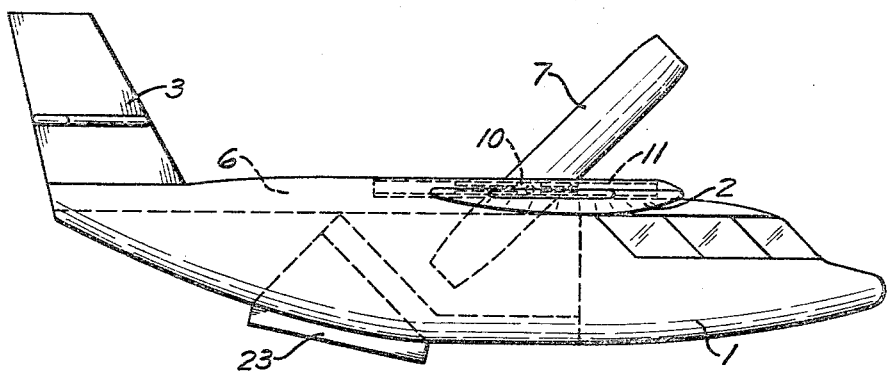
Figure 3:
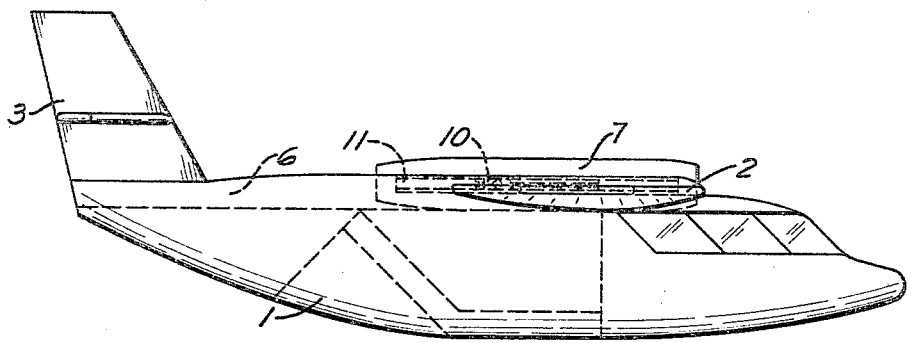
Figure 8:
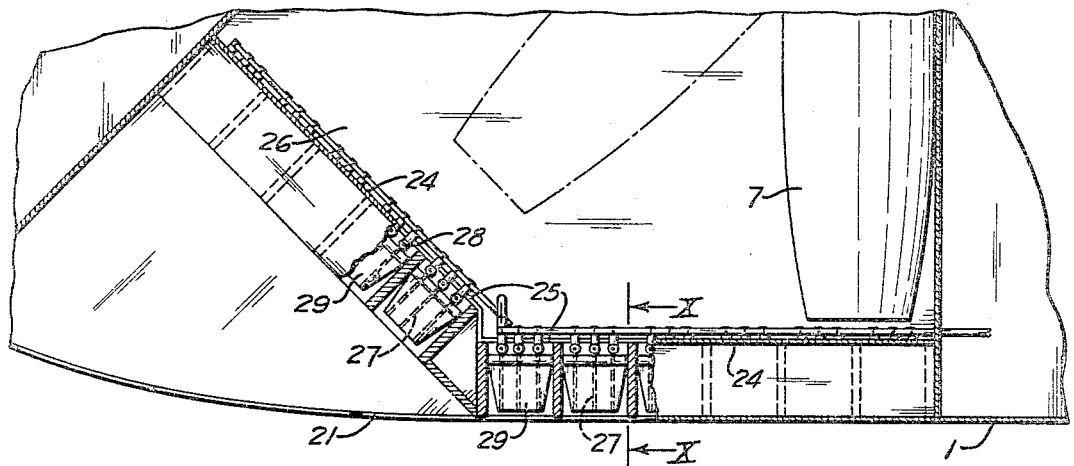
Figure 9:
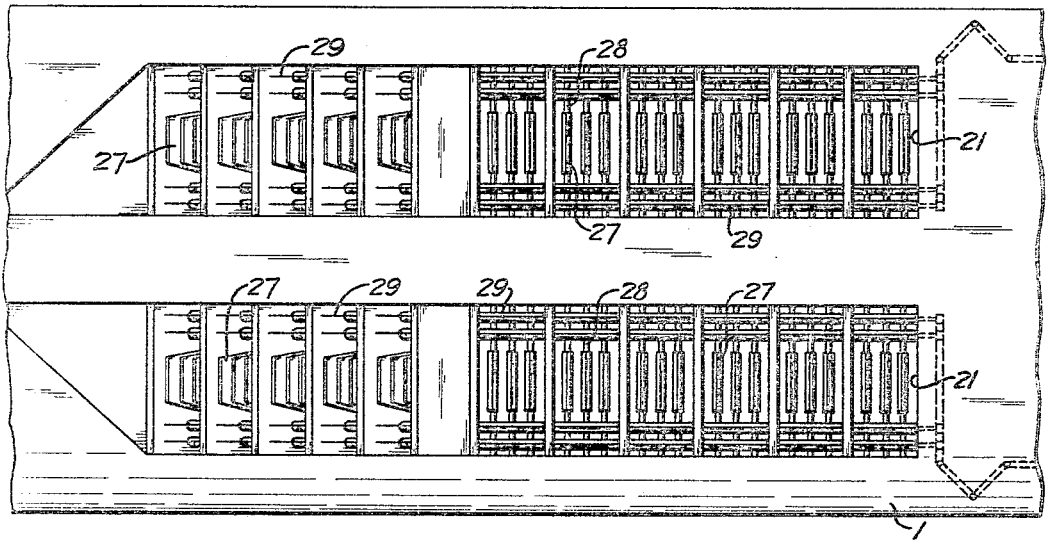
Figure 10:
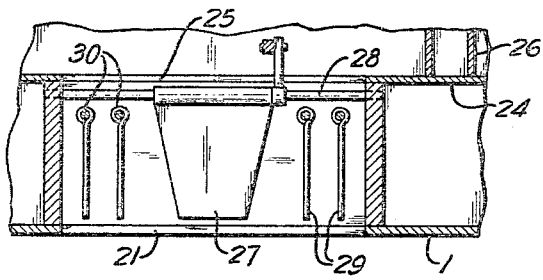

The preferred embodiment of the invention is illustrated in the accompanying drawings, in which FIG. 1 is a side view of my airplane in take-off condition;
FIG. 2 is a side view after the plane has left the ground and is starting to move forward;
FIG. 3 is a side view of the plane in normal flight;
FIG. 4 is a plan view of the plane in flight;
FIG. 5 is a front view of the plane in flight;
FIG. 6 is an enlarged fragmentary side view of the adjustable engine support;
FIG. 7 is a fragmentary vertical section taken on the line VII—VII of FIG. 6;
FIG. 8 is an enlarged fragmentary longitudinal section of the fuselage at take-off;
FIG. 9 is a fragmentary bottom view of the plane; and
FIG. 10 is a further enlarged vertical section taken on the line X—X of FIG. 8, the bottom doors being omitted from FIGS. 8, 9 and 10 to simplify the drawings.

Referring to the first two sheets of drawings, an airplane fuselage 1 of suitable design is provided with a pair of wings 2 extending from its opposite sides, and with the usual tail assembly 3. Due to the manner in which this plane takes off and lands, the wings can be shorter than usual. The fuselage also is provided with retractable landing gear 4 fore and aft. The top of the fuselage has a pair of parallel channels 6 running along it from front to back. Normally lying in these channels, that is, when the plane is in full flight, is a pair of jet engines 7. The engines are firmly connected to the fuselage behind their center of thrust by a pivotal connection. As is well known, the center of thrust of a jet engine is immediately behind the compressor section, which is at the front end. As shown in FIGS. 7 and 8, the pivotal connection may include a short shaft 8 between the engines and joined to them, and a trunnion 9 projecting from the outer side of each engine into a bearing block 10 that is slidable lengthwise of the fuselage in a track 11 extending lengthwise of the fuselage and rigidly connected to it. The bearing blocks may be held in the desired positions along the tracks by rods 12 and 13 connected to the front and rear ends of the blocks and extending into stationary hydraulic cylinders 14 and 15, where pistons (not shown) are mounted on the ends of the rods.

Rigidly connected to shaft 8 between the engines is a laterally projecting arm 17, the outer end of which is pivotally connected to suitable linkage system 18 that extends forward into the cockpit to a control lever or mechanism (not shown). The engines normally are locked in their horizontal position for conventional flight.

When it is desired to lift the airplane from the ground so that it can fly away, the pilot swings arm 17 forward in order to rotate the two engines in bearing blocks 10. This swings the rear ends of the engines down into the fuselage until the engines are substantially vertical as shown in FIGS. 1, 6, 7 and 8. At the same time or later the cylinders 14 and 15 can be operated by the pilot to move the engines backward or forward in tracks 11 in order to compensate for any unequal distribution of weight in the plane lengthwise thereof. The bottom of the fuselage is provided with a pair of parallel slots 21 that extend lengthwise of it beneath the engines so that the engine exhaust gases can escape freely from the bottom of the plane. These openings are closed during normal flight by suitable doors 22 and 23 that can be operated by the pilot. When the plane has risen to the desired safe height above the ground, the pilot starts to swing the engines back toward horizontal position. As they become tilted, as shown in FIG. 2, the plane begins to move forward as well as upward. The forward speed increases as the engines approach their normal reclining position, until they extend lengthwise of the fuselage as shown in FIG. 3. The airplane then performs like an ordinary jet plane.

To land this plane, the above procedure is reversed. That is, the pilot slowly swings the rear ends of the engines down into the plane, during which the speed of the plane decreases until it comes practically to a standstill when the engines become vertical. Then by controlling the thrust of the engines, the plane can be lowered to the ground.

Another feature of this invention is that, the balance or attitude of the plane, both laterally and longitudinally, is controlled as it rises from the ground by adjustable vanes that can divert the exhaust gases from the vertical engines in one direction or another as required. The vanes are independent of the engines. They are mounted in the fuselage. Thus, the fuselage is provided with a wall which, as shown in FIGS. 8 and 10, preferably is a partition wall 24 inside of it as distinguished from the bottom wall of the fuselage, that extends rearwardly from beneath the vertical engines and then for best results is inclined upwardly behind, but close to, the curved path in which the rear ends of the engines are swung as they are moved between their upper and lower positions. This wall is provided with a pair of parallel slots 25 extending lengthwise of it to permit the exhaust from the engines to pass through the wall to openings 21 while the engines are vertical and while they are being tilted back into horizontal position. Between the two slots there is a vertical partition wall 26 extending lengthwise of the fuselage to isolate the exhaust gases from one tilted or vertical engine from those of the other engine.

Pivotally mounted in each of the partition wall slots 25 is a large number of control vanes. As shown in FIGS. 8 and 10, some of these vanes are mounted on axes that are transverse to the fuselage in order to control pitch or lengthwise tilting of the plane. Others of the vanes are pivoted on axes in vertical longitudinal planes of the fuselage to control its lateral tilting or roll. Thus, along the center of each slot 25, there may be a row of transverse vanes 27 suspended from parallel shafts 28, and further rows of longitudinal vanes 29 located between the transverse vanes and the sides of the slot and suspended from long shafts 30. The transverse shafts 28 are turned by suitable mechananism connected with the elevator controls so that vanes 27 will act in unison with the elevators. Similarly, the longitudinal shafts 30 are turned by the aileron controls and therefore vanes 29 are operated with the ailerons.

It will be seen that the full thrust of the engines is used during lift-off and landing because none of their efficiency is lost by their exhaust gases having to change direction by passing through curved ducts. The slight change in direction of the exhaust gases caused by the small adjustment of the control vanes to balance the plane has no material effect on the efficiency of the engines. Since the vanes are separated from the jet engines and therefore are subjected to the intense heat of the enignes for only a few seconds during lift-off and landing, they are not damaged by prolonged exposure to severe heat like vanes that are mounted in jet engine outlets. As the center of thrust of the engines is above their connection to the fuselage the plane is very stable. Any tendency of the plane to tilt or roll can quickly be corrected by operating the control vanes. The two engines are so close together and so near the central longitudinal vertical plane of the fuselage that if one engine fails during take-off the other engine will not cause the plane to roll over. Whatever tendency to roll that there may be can be prevented by manipulating vanes 29 beneath the good engine. As the engines are tilted in either direction, they also can be moved lengthwise of the fuselage to preserve the balance of the plane.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A vertical take-off airplane comprising a fuselage, wings projecting from opposite sides of the fuselage, a pair of parallel jet engines normally extending along the top of the fuselage between the wings, means pivotally connecting the engines to the fuselage on a transverse axis, means for tilting the engines on said axis to swing their rear ends in a curved path down into the fuselage until the engines are substantially vertical, pivoted control vanes mounted in the fuselage in rows extending from beneath the vertical position of the engines rearwardly behind said path, some of the vanes being mounted on axes transverse to the fuselage and others of the vanes being mounted on axes transverse to said first-mentioned axes, the bottom of the fuselage being open below said vanes while the engines are vertical and rotating toward normal position, and means for adjusting said vanes on their axes while the exhaust from said engines is flowing down across them, whereby to control the attitude of the airplane.

2. A vertical take-off airplane as defined in claim 1, in which said rows of control vanes extend upwardly in the fuselage behind said curved path.

3. A vertical take-off airplane as defined in claim 1, including means for adjusting said pivotal connecting means lengthwise of the fuselage.

4. A vertical take-off airplane as defined in claim 1, including bearings for said pivotal connecting means, tracks extending lengthwise of the fuselage, said bearings being slidingly mounted in the tracks, and means for moving the bearings along the tracks to adjust said engines lengthwise of the fuselage.

5. A vertical take-off airplane comprising a fuselage, wings projecting from opposite sides of the fuselage, a pair of parallel jet engines normally extending along the top of the fuselage between the wings, means pivotally connecting the engines to the fuselage on a transverse axis, means for tilting the engines on said axis to swing their rear ends in a curved path down into the fuselage until the engines are substantially vertical, the fuselage being provided with a wall extending rearwardly from beneath the vertical position of the engines and then upwardly behind said path, said wall having longitudinal slots therein beneath the engines for passage of exhaust gases from the engines, pivoted control vanes disposed in said slots, some of the vanes being mounted on axes transverse to the slots and others of the vanes being mounted on axes extending lengthwise of the slots, and means for adjusting said vanes on their axes while the exhaust from said engines is flowing across them and through said slots to thereby control the attitude of the airplane, the bottom of the fuselage being open at the slots while said exhaust gases are striking the vanes.

6. A vertical take-off airplane as defined in claim 5, including a vertical partition wall extending from between the slots in said first-mentioned wall upwardly between the engines.

References Cited by the Examiner
UNITED STATES PATENTS 2,989,269  6/1961  Le Bel _____ 244—12
3,026,065  3/1962  Holland _____ 244—12

FERGUS S. MIDDLETON, *Primary Examiner.*

A. E. CORRIGAN, *Assistant Examiner.*